United States Patent
Thirumala et al.

(10) Patent No.: US 12,032,443 B2
(45) Date of Patent: Jul. 9, 2024

(54) SHADOW DRAM WITH CRC+RAID ARCHITECTURE, SYSTEM AND METHOD FOR HIGH RAS FEATURE IN A CXL DRIVE

(71) Applicant: Micron Technology, Inc., Boise, ID (US)

(72) Inventors: Sandeep Krishna Thirumala, Milpitas, CA (US); Lingming Yang, Meridian, ID (US); Amitava Majumdar, Boise, ID (US); Nevil Gajera, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/156,340

(22) Filed: Jan. 18, 2023

(65) Prior Publication Data

US 2023/0236933 A1    Jul. 27, 2023

Related U.S. Application Data

(60) Provisional application No. 63/302,052, filed on Jan. 22, 2022.

(51) Int. Cl.
*G06F 11/10*    (2006.01)
*G06F 13/42*    (2006.01)

(52) U.S. Cl.
CPC ...... *G06F 11/1076* (2013.01); *G06F 11/1004* (2013.01); *G06F 13/4221* (2013.01)

(58) Field of Classification Search
CPC ............. G06F 11/1076; G06F 11/1004; G06F 13/4221
See application file for complete search history.

(56) References Cited

U.S. PATENT DOCUMENTS

| | | | | |
|---|---|---|---|---|
| 6,012,123 A | * | 1/2000 | Pecone | G06F 11/1076 711/111 |
| 2003/0236943 A1 | * | 12/2003 | Delaney | G06F 11/1076 714/E11.034 |
| 2010/0199039 A1 | * | 8/2010 | Bauman | G06F 11/3433 711/E12.001 |
| 2013/0191685 A1 | * | 7/2013 | Stephens | G06F 11/085 714/E11.034 |
| 2013/0191703 A1 | * | 7/2013 | Meaney | G06F 11/1004 714/763 |

(Continued)

*Primary Examiner* — Matthew M Kim
*Assistant Examiner* — Indranil Chowdhury
(74) *Attorney, Agent, or Firm* — Wood IP LLC; Theodore A. Wood

(57) ABSTRACT

Systems, apparatuses, and methods can include a multi-stage cache for providing high reliability, availability, and serviceability (RAS). The multi-stage cache memory comprises a shadow DRAM, which is provided on a volatile main memory module, coupled to a memory controller cache, which is provided on a memory controller. During a first write operation, the memory controller writes data with a strong error correcting code (ECC) from the memory controller cache to the shadow DRAM without writing a RAID (Redundant Arrays of Inexpensive Disks) parity data. During a second write operation, the memory controller writes the data with the strong ECC and writes the RAID parity data from the shadow DRAM to a memory device provided on the volatile main memory module.

20 Claims, 8 Drawing Sheets

(56) References Cited

U.S. PATENT DOCUMENTS

| | | | | |
|---|---|---|---|---|
| 2014/0025887 | A1* | 1/2014 | Kim | G06F 3/0689 |
| | | | | 711/114 |
| 2015/0154066 | A1* | 6/2015 | Grimsrud | G06F 11/108 |
| | | | | 714/764 |
| 2019/0163565 | A1* | 5/2019 | Meaney | G11C 29/52 |
| 2020/0075079 | A1* | 3/2020 | Kim | G11C 11/4093 |
| 2020/0135292 | A1* | 4/2020 | Kim | G11C 29/783 |
| 2023/0096375 | A1* | 3/2023 | Confalonieri | G06F 11/1004 |
| | | | | 711/154 |
| 2023/0214323 | A1* | 7/2023 | Confalonieri | G06F 12/0868 |
| | | | | 711/143 |
| 2023/0236930 | A1* | 7/2023 | Sforzin | G06F 11/108 |
| | | | | 714/6.24 |
| 2023/0236934 | A1* | 7/2023 | Yang | G06F 3/0689 |
| | | | | 714/6.24 |
| 2023/0280940 | A1* | 9/2023 | Del Gatto | G06F 3/0656 |
| 2023/0385192 | A1* | 11/2023 | Lee | G06F 13/28 |
| 2024/0004751 | A1* | 1/2024 | Sforzin | G06F 11/10 |
| 2024/0004759 | A1* | 1/2024 | Sforzin | G06F 11/1076 |
| 2024/0004760 | A1* | 1/2024 | Amato | G06F 11/1076 |
| 2024/0004791 | A1* | 1/2024 | Confalonieri | G06F 12/0802 |

\* cited by examiner

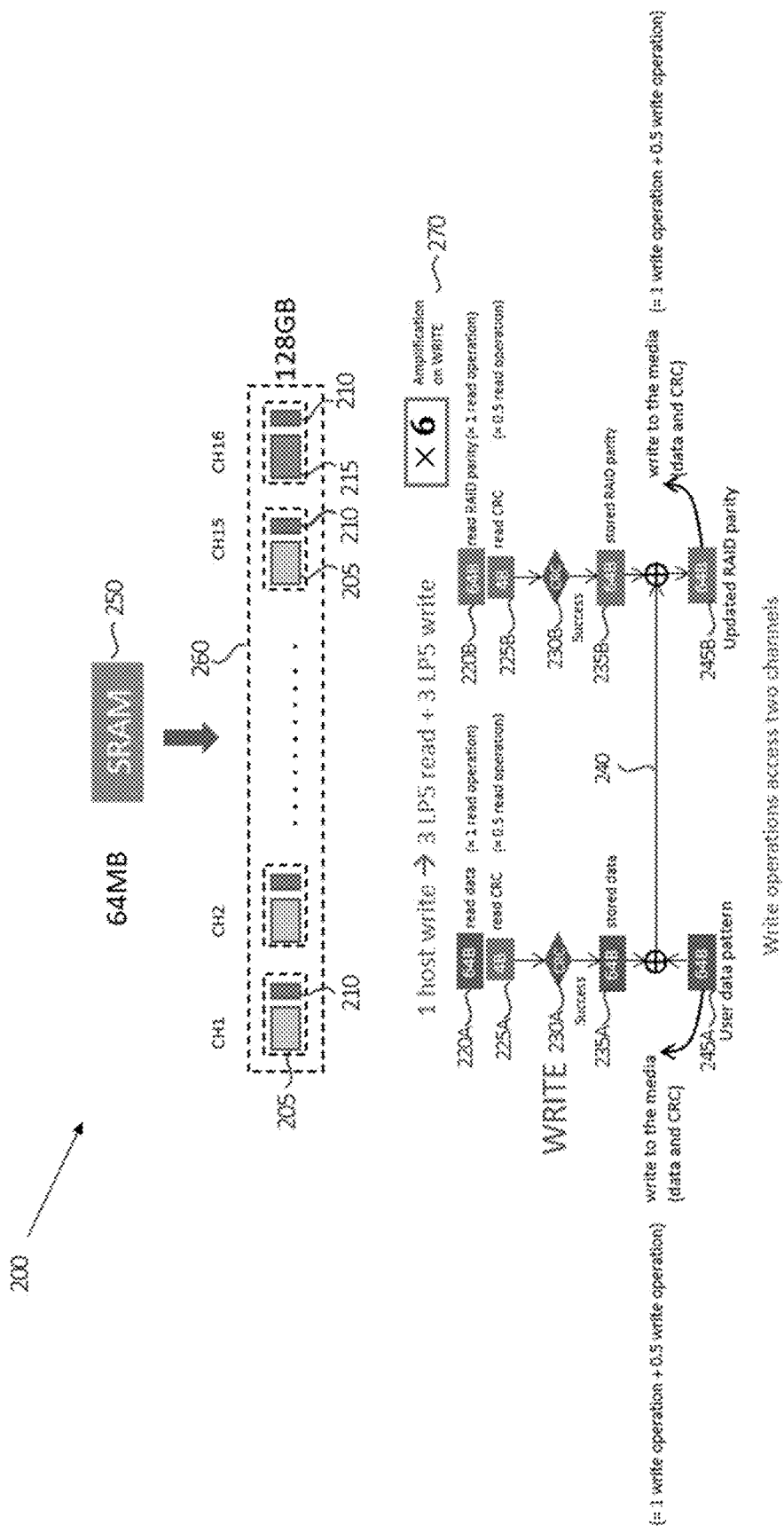
FIG. 2A
(Conventional)

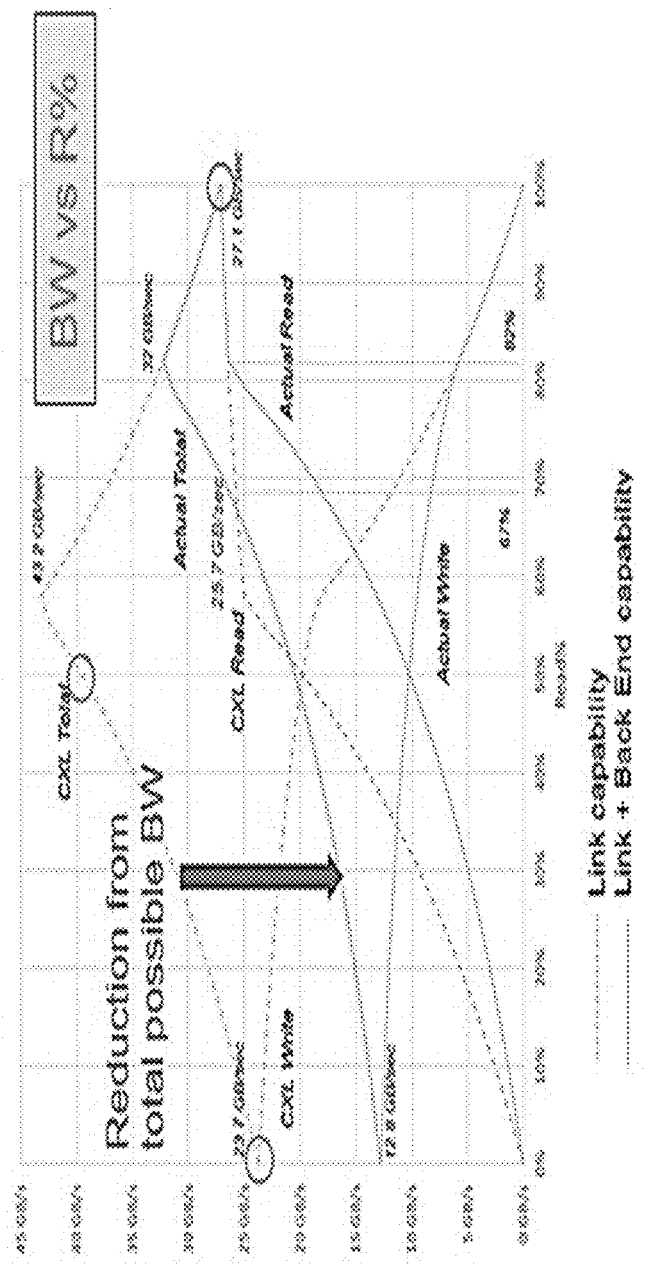
FIG. 2B
(Conventional)

| Metric | Standard 15+1 RAID | Standard 8+2 ChipKill | Embodiments |
|---|---|---|---|
| | 15+1 RAID | 3x(8+2)~LPCK | 1x(15+1)+shadow DRAM |
| BW at 70/30 workload | 27 | 32 | 53* |
| 100% Write BW | 12 | 24 | 24* |
| Loaded latency | 300ns | 200ns | 200ns* |
| unloaded latency | 120ns | 75ns | 75ns* |
| Overfetch | 64B | 256B | 64B |
| Power | 4W at 24GB/s | 7W^ at 32GB/s | 5W at 32GB/s* |
| Cache hit rate | NA | 50% | 50% |
| SRAM size | NA | 64MB | 64MB |
| %OP | 7% | 25% | 16% |
| QoS | No concern | Power limited | Degrades after shadow DRAM capacity is all used |
| RAS | high, ~AFR 5E-8 | high, ~AFR 5E-8 | medium |
| Controller complexity | Med | Low | High |

FIG. 6

SHADOW DRAM WITH CRC+RAID ARCHITECTURE, SYSTEM AND METHOD FOR HIGH RAS FEATURE IN A CXL DRIVE

CROSS-REFERENCE TO RELATED APPLICATIONS

This application claims benefit to U.S. Provisional Patent Application No. 63/302,052, filed Jan. 22, 2022, the disclosure of which is incorporated herein in its entirety by reference.

FIELD OF TECHNOLOGY

The present disclosure relates generally to semiconductor memory devices and methods, and more particularly, to apparatuses, systems, and methods for a shadow dynamic random access memory (DRAM) with cyclic redundancy check (CRC)+redundant arrays of inexpensive disks (RAID) architecture for providing high reliability, availability, and serviceability (RAS) in a compute express link (CXL) drive.

BACKGROUND

Memory devices (also referred to as "memory media devices") are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), DRAM, static random access memory (SRAM), synchronous dynamic random access memory (SDRAM), and thyristor random access memory (TRAM), among others. Non-volatile memory can provide persistent data by retaining stored data when not powered and can include (Not-AND) NAND flash memory, (Not-OR) NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

Some memory devices, such as DRAM products, require high RAS, because DRAM memory devices are often plagued with errors and can lead to significant server downtime in datacenters. Therefore, a low-power DRAM design targeted at datacenters must be amenable to an architecture that provides a high standard of reliability. A common expectation of business-critical server DRAM systems is that they can withstand a single DRAM chip failure.

There are two general approaches to solving failure and corruption problems—RAID and error-correcting memory (ECC memory). A RAID scheme can be utilized to detect and/or correct errors across multiple memory devices (e.g., chips) of a memory system. RAID protection can allow data recovery within a memory system even if a constituent chip is completely damaged (e.g., non-functional). In some RAID approaches, error correction can be used to encode data in such a manner that minor errors can be corrected and large errors may be detected.

However, traditional RAID solution involves write amplification which reduces the overall bandwidth. Write amplification is an undesirable phenomenon because the amount of information written to the storage media is a multiple of the amount intended to be written. This multiplying effect increases the number of writes required, which decreases reliability, and the increased writes also consumes bandwidth. This has resulted in the industry moving from RAID to a chipkill (also spelled "chip kill") design at the cost of (i) higher power and (ii) die/cost penalty.

Many modern servers employ a chipkill correct, which is an advanced type of memory error detection and correction, to meet their reliability requirements. The increase of memory capacity, the density of memory and the increase in speed of the memory subsystem has significantly increased the risks of multi-bit memory errors that cannot be corrected by standard ECC and result in the system hanging. Memory devices can be designed for storing error detection/correction data (e.g., ECC data) for providing error correction/detection capabilities.

The term "ECC" as used herein is intended to cover various types of error detection and/or correction data such as check sums, cyclic redundancy check (CRC) data, parity data, etc. Standard ECC memory allows for detection of multi-bit data corruption, and correction of single-bit errors, typically through the implementation of a Single Error Correction Double Error Detection (SECDED) for bit failures. Chipkill correct significantly improves memory reliability compared to SECDED by providing correct memory accesses even when a DRAM device has failed completely.

The fundamentals of chipkill operations are similar to that of RAID, which protects against disk failure, except that now the concept is applied to individual memory chips. Chipkill memory can correct multi-bit memory errors and in doing so, increases system availability considerably. Chipkill functions so that if a chip fails (or has exceeded a threshold of bit errors), another, spare, memory chip is used to replace the failed chip. Chipkill can provide single-chip correction and double-chip detection (SCCDCD) for chip failure detection.

When a chip fails, it leads to an error in the codeword. Chipkill-correct solutions correct a single bad symbol and detect up to two bad symbols in each codeword. In a typical chipkill-correct memory system, each word in memory is stored in the form of a codeword, which is the data word plus redundant check bits. Each codeword is typically broken down into groups of bits, called symbols. A symbol is simply a group of adjacent bits. A symbol is referred to as a data symbol if it holds data, or as a check symbol if it holds the redundant information for error detection or correction. A group of data symbols and the check symbols protecting that group of data symbols together form a codeword. Each data chip provides one data symbol and extra/redundant chips so that they are provisioned for storing check symbols that are used to locate and correct faulty symbol (chip).

Chipkill-correct solutions require a minimum of two or three check symbols per codeword to provide single symbol correct (SSC) double symbol detect (SSCDSD). As chipkill needs a minimum of two extra chips for storing these symbols, commercial implementations of chipkill require that 18 chips be activated for each memory access (16 for data and 2 for check symbols).

However, existing chipkill-correct solutions incur high power or storage overheads, or both because they use dedicated error-correction resources per codeword to perform error correction. This requires high overhead for correction and results in high overhead for error detection. Commercially available chipkill correct solutions that can detect up to two failed devices and correct one failed SSCDSD device require accessing 36 DRAM devices per memory request.

In such a 32+4 configuration, having 36 devices per rank leads to high memory power consumption because every device in a rank should be accessed per memory request. On the other hand, a weaker SSC solution only requires accessing 18 devices per memory request. Both 16+2 and 32+4 configuration offer chipkill (SSCDSD and SSC respectively) and comes with 12.5% of redundancy overhead. This overhead leads to significant increase in cost of DRAM modules offering chipkill protection Thus, both conventional RAID and chipkill schemes have some shortcomings. Conventional chipkill approaches involving the use of 16+2 or 32+4 configurations come with 12.5% die overhead with high power consumption because of the need to access all chips simultaneously during read/write operation. Although conventional CRC+RAID designs provide lower power consumption with respect to chipkill designs, they undergo bandwidth penalty due to write amplification.

In the computing industry, chipkill is widely used for DRAM technology. RAID is widely used for NAND technology, not DRAM technology. There have been a few attempts to use RAID for DRAM technology. However, they suffer the drawbacks of as discussed above.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 2A illustrates a conventional 15+1 CRC+RAID design.

FIG. 2B is a graph of the reduced bandwidth of the conventional 15+1 CRC+RAID design of FIG. 2A.

FIG. 6 is a table comparing the metrics of the 15+1 CRC+RAID+Shadow DRAM architecture of the present disclosure to a standard 15+1 RAID and a standard 8+2 Chipkill.

DETAILED DESCRIPTION

Figure 1:
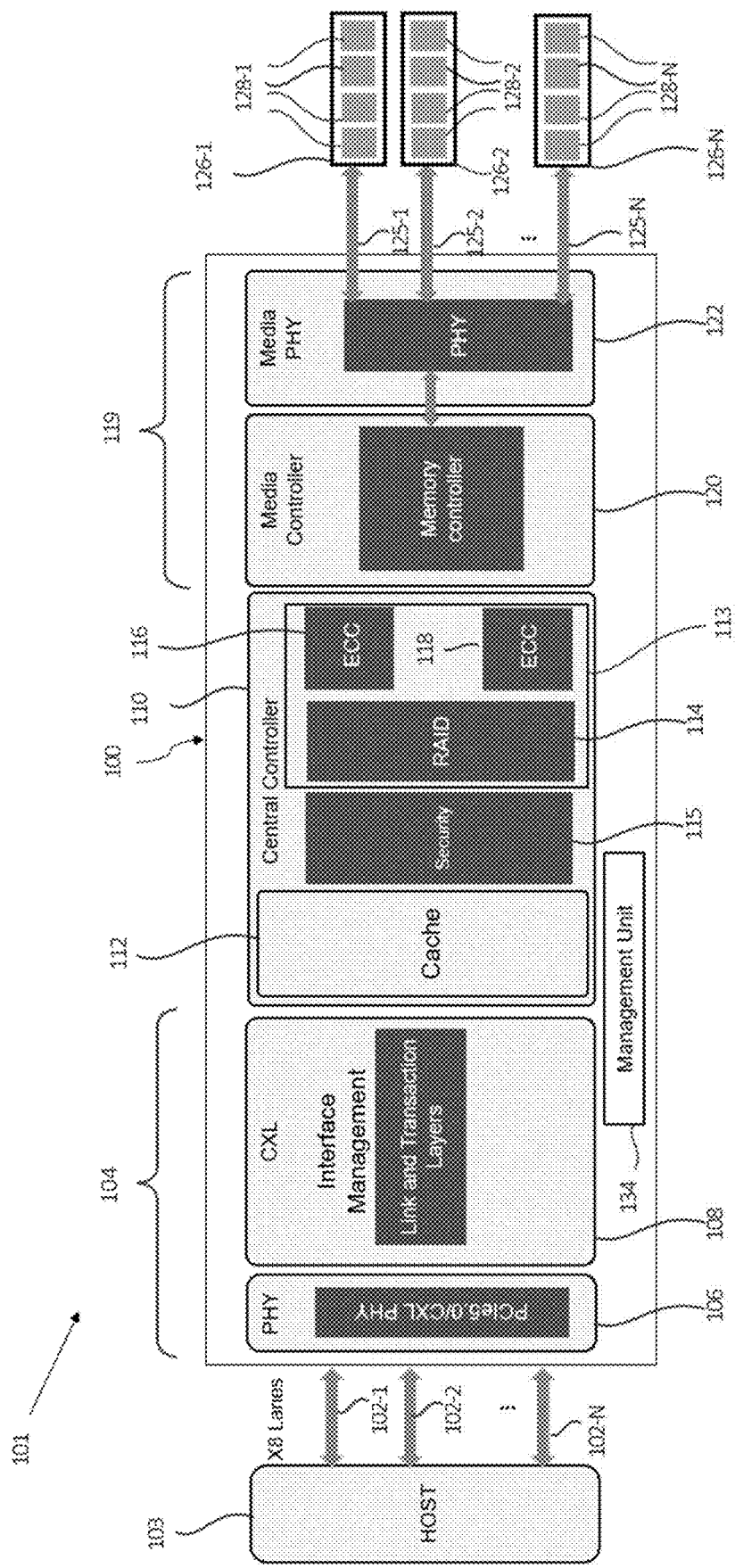
FIG. 1 illustrates a functional block diagram in the form of a computing system including a controller for mitigating write amplification in accordance with embodiments of the present disclosure.

Systems, apparatuses, and methods related to a shadow DRAM with CRC+RAID architecture for providing high RAS in a CXL drive are described herein. An example method can include receiving, at a memory controller from a host, a command and firmware data. The memory controller can manage a memory device, such as a DRAM memory device, where a CXL protocol is used to communicate between a host and a memory device that includes the memory controller.

The present disclosure provides a solution that overcomes the drawbacks discussed above. Embodiments described herein harnesses the benefit of low power CRC+RAID architecture for chipkill level protection as well as higher bandwidth. The embodiments describe herein revives the benefits of the RAID architecture which has significantly low overhead compared to low power chipkill (LPCK) by improving its bandwidth.

Some embodiments are directed to a RAS solution for next generation CXL drives to achieve high bandwidth along with chipkill level protection. This can be implemented by using a shadow DRAM before write operations are performed in the main DRAM module which exhibits high bandwidth and low die/cost overheads. A shadow DRAM can be built on top of a CRC+RAID architecture and can function as a two stage cache with a shadow DRAM. During the write operation, the shadow DRAM exhibits a low bandwidth before the data is written to the main DRAM module which exhibits high bandwidth and low die/cost overheads.

In some embodiments, the memory system can be a CXL compliant memory system (e.g., the memory system can include a peripheral component interconnect express (PCIe)/CXL interface). CXL is a high-speed central processing unit (CPU)-to-device and CPU-to-memory interconnect designed to accelerate next-generation data center performance. CXL technology maintains memory coherency between the CPU memory space (of a host) and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. The present disclosure includes apparatuses and methods related to a CXL technology, which provides a separate memory module that plugs into a PCIe5 slot which gives the system the capability to add circuits inside the module to improve the module.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates a block diagram in the form of a computing system 101 including a controller 100 for managing the transfer of data, commands, and/or instructions between a host 103 and at least one memory device (individually or collectively referred to as memory device 126) in accordance with embodiments of the present disclosure. As an example, the controller 100 can be used to read and/or write data to and from a memory device 126. The computing system 101 can include a memory controller 100 comprising a front end portion 104, a central controller portion 110, and a back end portion 119. Further, the computing system 101 can be coupled to a host 103 and memory devices 126.

In various embodiments, the memory device 126 may be a DRAM memory device. In some embodiments, the present disclosure includes apparatuses and methods related to a CXL-attached memory module, which will be described in more detail below. The present disclosure relates to adding a DRAM as memory into the system through a CXL/PCIe5 slot. The present disclosure relates to an add-in CXL module that has the capability to add memory using a PCIe5 link allowing for bidirectional transmission. The present disclosure provides the ability to simply add or remove DRAM memory into a system via a CXL/PCIe5 slot. This CXL-attached DRAM memory module allows for increased memory bandwidth. In some embodiments, the CXL DRAM memory module can be a memory expansion card provided with a PCIe/CXL interface.

The host 103 can be a personal laptop computer, a desktop computer, a digital camera, a mobile telephone, a memory card reader, or an Internet-of-Things (IoT) enabled device, among various other types of systems. The host 103 can include a number of processing resources (e.g., one or more processors, microprocessors, or some other type of controlling circuitry) capable of accessing a memory system. The host 103 can include a system motherboard and/or backplane and can include a number of processing resources (e.g., one or more processors, microprocessors, or some other type of controlling circuitry).

The front end portion 104 can include a flexible bus interconnect and use CXL.io and CXL.mem. The memory controller 100 can have a front end portion 104 that includes an interface 106 to couple the memory controller 100 to the host 103 through input/output (I/O) lanes 102-1, 102-2, . . . , 102-N (individually or collectively referred to as I/O lanes 102) and interface management circuitry 108 to manage the interface 106. In some embodiments, there can be, for example, eight (8) I/O lanes 102 and in other embodiments there can be sixteen (16) I/O lanes 102. In some embodiments, the plurality of I/O lanes 102 can be configured as a single port.

The interface 106 coupling the host 103 to the memory controller 100 can include, for example, a physical interface employing a suitable protocol (e.g., a data bus, an address bus, and a command bus, or a combined data/address/command bus). Such protocols may be custom or proprietary, or the interface 106 may employ a standardized protocol, such as PCIe, CXL, Gen-Z, cache coherent interconnect for accelerators (CCIX), or the like.

In one embodiment, the interface 106 can be a PCIe 5.0 interface coupled to the I/O lanes 102. In some embodiments, the memory controller 100 can receive access requests involving at least one of the cache memory 112 and/or the memory device 126 via the PCIe 5.0 interface 106 according to a CXL protocol. The interface 106 can receive data from the host 103 through I/O lanes 102. The interface management circuitry 108 may use CXL protocols to manage the interface 106.

Multiple link and transaction layers can be provided in the interface management circuitry 108 to provide for communication via I/O lanes 102. With reference to the CXL transaction layers, various components can be included to enable transaction layer processing for PCIe/CXL.io communications and CXL.cache and CXL.memory transactions.

The memory controller 100 can include a central controller portion 110 that can control, in response to receiving a request from the host 103, performance of a memory operation. The memory operation can be a memory operation to read data from a memory device 126 or an operation to write data to a memory device 126.

The central controller portion 110 can include a cache memory 112 to store data associated with performance of a memory operation and/or a security component 115 to encrypt data before the data is stored in the DRAM memory device 126, and/or the cache memory. Examples of the security component 115 can include, but are not limited to, software and circuitry configured to implement data encryption, data hashing, data masking, and data tokenization. In some embodiments, in response to receiving a request from the host 103, data from the host 103 can be stored in cache lines of the cache memory.

In some embodiments, data in the cache memory 112 can be written to a memory device 126. In some embodiments, the cache memory 112 can be implemented as a SRAM cache memory. In some embodiments, the data can be transferred from the cache memory 112 to be encrypted using an Advanced Encryption Standard (AES) before being written to a memory device 126. In some embodiments, the data can be encrypted using an AES encryption before the data is stored in the cache memory. However, embodiments are not so limited, as, for example, the data can be encrypted after being read from the cache memory 112.

The central controller portion 110 may be provided with a RAID/ECC component 113 that includes a RAID component 114 and ECC components 116, 118 to provide a CRC+RAID architecture. In some embodiments, the RAID component 114 and ECC components 116, 118 may be embodied as integrated components to form a unit on the RAID/ECC component 113 or as separate components in the central controller portion 110. The RAID component 114 can be used to detect and/or correct errors across multiple memory devices (e.g., chips) of a memory system. RAID protection can allow data recovery within a memory system even if a constituent chip is completely damaged (e.g., non-functional).

The term "ECC" is intended to cover various types of error detection and/or correction data such as check sums, CRC data, parity data, etc. The ECC encoding circuitry 116 can be used to ECC encode the data, and the ECC decoding circuitry 118 can be used to ECC decode the data. As used herein, the term "ECC encoding" can refer to encoding data by adding redundant bits to the data. As used herein, the term "ECC decoding" can refer to examining the ECC encoded data to check for any errors in the data. The ECC encoding circuitry can encode data that will be written to the DRAM memory device 126.

In some embodiments, an error detected in the data can be corrected immediately upon detection. ECC decoding circuitry can decode data that has been previously ECC encoded. ECC data generated using the ECC components can be written to and stored in the memory devices 126. In some embodiments, the memory controller 100 can implement LPCK error correction. As used herein and discussed above, the term "chipkill" generally refers to a form of error correction that protects memory systems (e.g., the computing system 101) from any single memory chip failure as well as multi-bit error from any portion of a single memory chip. In some embodiments, the computing system 101 can generate an error correction code by using a chipkill correction algorithm on the data. It's The memory controller 100 can comprise a back end portion 119 comprising a media controller and a physical (PHY) layer that couples the memory controller 100 to a plurality of memory ranks 128 of a single DRAM memory device or a plurality of DRAM memory device 126-1, 126-2, . . . , 126-N (individually or collectively referred to as memory device 126). In some embodiments, the back end portion 119 can include multiple PHY layers 122 and a media controller portion 120 that is configured to drive the channels 125 that couple the memory controller 100 to the memory device 126. As used herein, the term "PHY layer" generally refers to the physical layer in the Open Systems Interconnection (OSI) model of a computing system. The PHY layer 122 may be the first (e.g., lowest) layer of the OSI model and can be used to transfer data over a physical data transmission medium. In some embodiments, the physical data transmission medium can be a plurality of channels 125-1, 125-2, . . . , 125-N (individually or collectively referred to as channels 125).

In some embodiments, the back end portion 119 is configured to couple the PHY layers 122 to a plurality of memory ranks 128-1, 128-2, . . . , 128-(N) (individually or collectively referred to as memory ranks 128), respectively, of a memory device 126. As used herein, the term "memory ranks" generally refers to a plurality of memory chips (e.g., DRAM memory chips) that can be accessed simultaneously. In some examples, a memory rank can be sixty four (64) bits-wide and each memory rank can have eight (8) pages. However, embodiments are not so limited to these parameters.

In some embodiments, the physical data transmission medium can be configured as a single channel that couples to a single DRAM memory device 126. The controller interfaces can include one CXL (PCIe5) link with one transmission channel and one reception channel. DRAM memory can be added into the system through a CXL/PCIe5 slot. The add-in CXL module has the capability to add memory using a PCIe5 link allowing for bidirectional transmission.

In FIG. 1, the PHY layer 122 can comprise a plurality of PHY layers, and the media controller 120 can comprise a plurality of media controllers. Each media controller 120 can also correspond to one of the plurality of PHY layers 122. In some embodiments, each media controller can execute commands independent of the other media controllers. Therefore, data can be transferred from a PHY layer through a channel 125 to the memory device 126 independent of other PHY layers and channels.

In some embodiments, the central controller 110 can also include a plurality of RAID components (individually or collectively referred to as RAID components 114) wherein each of the RAID components 114 can be coupled to different ECC encoding circuitry 116 and ECC decoding circuitry 118. Each of the RAID components 114 can correspond to one of the media controllers (individually or collectively referred to as media controllers 120). This allows a separate RAID component 114 and a separate media controller 120 to be dedicated to each of the channels 125-1, 125-2, . . . , 125-N). A RAID state machine can implement the functionality of the RAID components 114. By dedicating a separate RAID component 114 and a separate media controller 120 to each channel 125, each channel 125 can be driven individually and receive a separate command and address than other channels 125.

Each media controller 120 executes commands independently of the other media controllers 120. This RAID architecture can provide more flexibility to the memory system regarding how much data is written to a memory device 126 and when the data is written to a memory device 126 in comparison to the LPCK architecture. A RAID component 114 can be striped across multiple channels 125. If a RAID component 114 is striped across multiple channels 125, a RAID state machine can be shared across multiple channels 125. This allows a RAID component 114 to drive a plurality of channels 125 substantially simultaneously.

The back end portion 119 can be configured to couple the PHY layer portion 119 to a plurality of memory ranks. In some embodiments, the memory ranks can include DRAM memory ranks 128-1, . . . , 128-N (individually or collectively referred to as DRAM memory ranks 128). The back end portion 119 may be connected to the plurality of memory ranks 128 through the plurality of channels 125. Therefore, data can be transferred from a PHY layer 122 through a channel 125 to a memory device 126 independent of other PHY layers 122 and channels 125.

The memory device 126 may include an array of memory cells, such as a memory array. The memory cells of the memory array may be arranged in a plurality of memory regions (e.g., memory rows, memory columns, memory bank subarrays, memory banks, logical memory ranks or dies, etc.). In these and other embodiments, the memory regions of the memory array can be arranged in one or more groups (e.g., groups of memory banks, one or more logical memory ranks or dies, etc.). The memory cells in the memory array can include different memory media types, including capacitive, magnetoresistive, ferroelectric, phase change, or the like.

The memory controller 100 may include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

FIG. 2A illustrates a traditional 15+1 CRC+RAID design 200, which is included for comparison. As discussed above, conventional CRC+RAID designs provide lower power consumption with respect to chipkill designs, but they suffer bandwidth penalty due to write amplification. Write amplification is an undesirable phenomenon because the amount of information written to the storage media is a multiple of the amount intended to be written. This multiplying effect increases the number of writes required, which decreases reliability, and the increased writes also consumes bandwidth. As used herein, the term "bandwidth" generally refers to a maximum amount of data written from one component in a memory system to another component within the same memory system or external to the memory system in a given amount of time.

The term "write amplification" as used herein refers to an occurrence when the total number of actual writes to a memory device is typically more than the number of writes intended to be written by the host 103. In FIG. 2A, when writing data to the memory device, a "duplicate" set of data in the form of a checksum is written to another part of the memory subsystem. If a memory failure occurs then the data is immediately recovered by re-calculating the data from the checksum information. This procedure allows the system to correct 2, 3, and 4 bit errors, and even a whole DRAM chip failure. However, writing the "duplicate" set of data causes write amplification, because the write operation requires simultaneous access to multiple channels, (e.g., two channels).

In general, the host device may transmit data over data channels as part of a write operation to store data in an array of memory cells of a memory device. Specifically, in FIG. 2A, during the write operation of a traditional 15+1 CRC+RAID design 200, the data is transferred from the cache included on a memory controller 100, as described above, to a memory device 260 over sixteen channels, CH1, CH2, ... CH16. The cache can be implemented as a SRAM cache memory 250.

The memory device 260 may provide a 128 GB storage capacity. In this design, there are fifteen operating channels CH1, CH2, ... CH15 that store the data, and one channel, CH16, that store the RAID parity data, hence the name 15+1 design. Each of the fifteen channels CH1, CH2, ... CH15 transfer 64B user data block 205, appended by 4B CRC parity data 210. Channel CH16 transfers 64B RAID parity data 215 appended by 4B CRC parity data 210.

The CRC parity data 210 can be checked during the write or read operation to detect if the data block becomes corrupt. The RAID parity data 215 can be used as an additional level of integrity protection for the data being written into the memory device 260. The RAID parity data 215 can be used to reconstruct channel data, if any channel fail. This allows memory contents to be reconstructed despite the complete failure of one die.

To perform a write operation into a particular channel (e.g., CH1), two channels are desirably simultaneously accessed, and six (6) operations are be performed. The six (6) operations include 3 logical page LP5 reads and 3 logical page LP5 writes. In this example, the pair of channels, data channel CH1 and RAID parity channel CH16, are accessed simultaneously. The channel CH1 write operations (blocks 220A-235A and 245A) and the channel CH16 RAID parity write operations (blocks 220B-235B and 245B) are preformed simultaneously, as shown in parallel in FIG. 2A. In block 220A, the 64B data is read out of the memory device, which represents one (1) read operation.

Simultaneously in block 220B, the 64B RAID parity data is read out of the memory device, which represents another one (1) read operation. In block 225A, the 4B CRC data is read out of the memory device, which represents a half (0.5) read operation. Simultaneously in block 225B, the 4B CRC data is read out of the memory device, which represents another half (0.5) read operation. The reason why the 4B read equals a half (0.5) is because, in this example, the memory system has a memory read/write granularity of 32B and a memory (cache) line size of 128B.

Here, "read/write granularity" refers to the minimum amount of data that is read or written in each read or write operation. This means that the minimum read/write operation that can be performed is based on a scale of 32B. Based on the scale factor, 64B equals one (1) read/write operation. Therefore, any read/write operation that is less than or equal to 32B is set equal to 32B, which on the scale factor is a 0.5 read/write operation.

In blocks 230A and 230B, the CRC check is performed. If the CRC is correct, the system prepares to write the new user data (in block 235A) and the new RAID parity data (in block 235B), to be stored in the memory device by performing a checksum calculation of the user data in comparison to the RAID parity data in block 240. Then, in block 245A, the new user data (1 write operations) and the new CRC parity data (0.5 write operations) are written to the memory device (the main memory DRAM 260). In block 245B, the new RAID parity data (1 write operations) and the new CRC parity data (0.5 write operations) are updated by being written to the memory device (the main memory DRAM 260).

In sum, the amplification on a write operations requires six (6) operations (indicated as reference 270) that include 3 logical page LP5 reads and 3 logical page LP5 writes. The total read operations equal 3 LP5 reads, which includes 1.5 read operations on data channel CH1 plus 1.5 read operations on RAID parity data channel CH16. The total write operations equal 3 LP5 writes, which includes 1.5 write operations on data channel CH1 plus 1.5 write operations on RAID parity data channel CH16.

FIG. 2B is a graph illustrating the reduced CXL bandwidth in a traditional 15+1 CRC+RAID scheme. Due to the write amplification exhibited by the RAID scheme, the overall bandwidth reduces. The six operations described with regards to FIG. 2A degrades the bandwidth. This resulted in the industry moving from the traditional 15+1 CRC+RAID design to 8+2 chipkill design at the cost of (i) higher power and (ii) die/cost penalty.

Figure 3A:
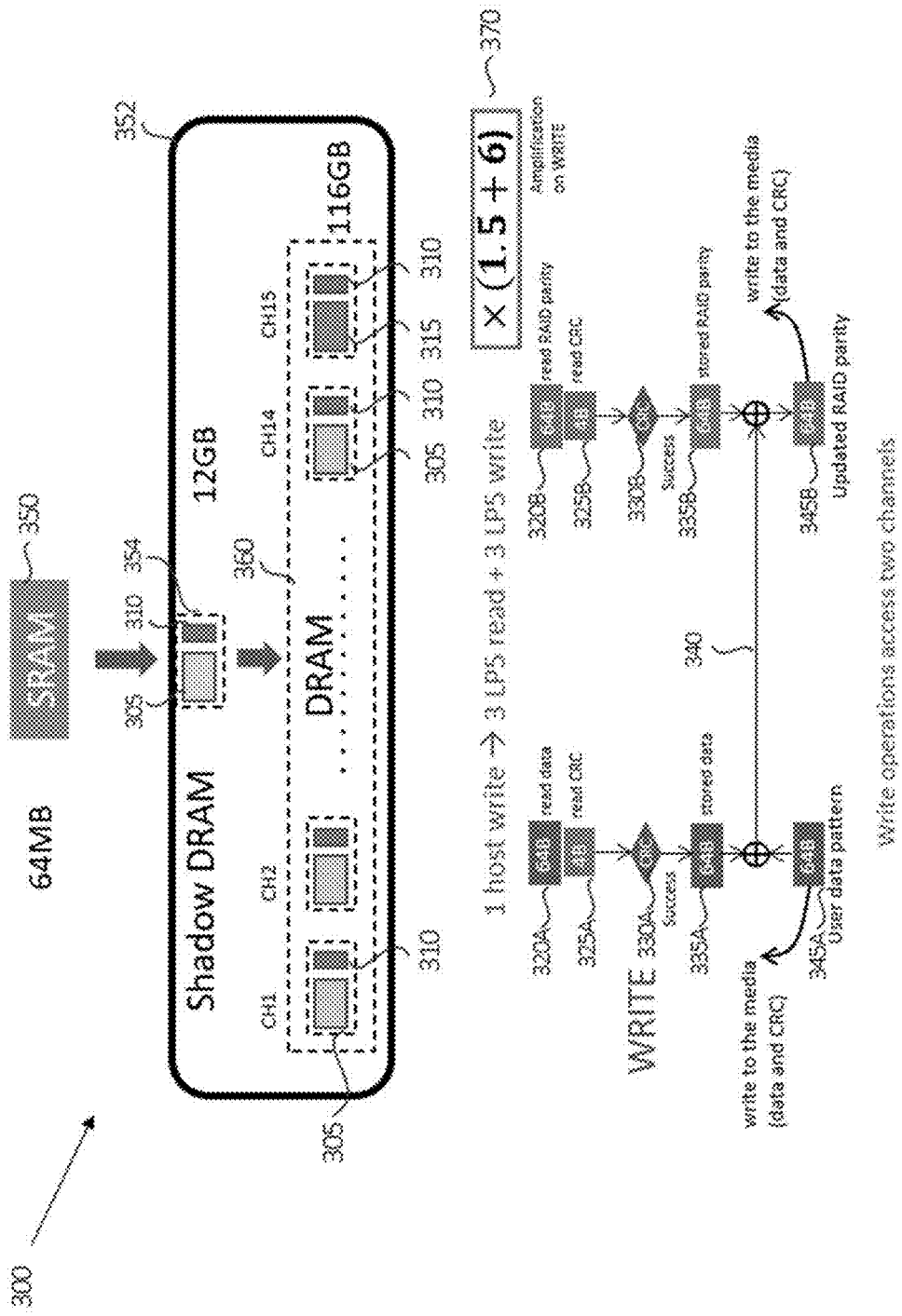
FIG. 3A illustrates a shadow DRAM with a CRC+RAID architecture in accordance with the embodiments.

FIG. 3A illustrates a shadow DRAM with CRC+RAID architecture 300 for providing high RAS in a CXL drive in accordance with embodiments of the present disclosure. The shadow DRAM with CRC+RAID architecture 300 is a modified 15+1 design in comparison to the traditional design 200. As described above, traditional 15+1 CRC+RAID design suffers from a write bandwidth bottleneck of 12 GB/s and 100% write performance due to its write amplification.

In contrast to the traditional, embodiments described herein improve the write bandwidth of CRC+RAID architecture without losing its advantage of power. Embodiments described herein harnesses the benefit of low power CRC+RAID architecture for chipkill level protection as well as higher bandwidth. The embodiments described herein revives the benefits of the RAID architecture which has significantly low overhead compared to LPCK by improving its bandwidth.

Some embodiments are directed to a RAS solution for next generation CXL drives to achieve high bandwidth along with chipkill level protection. A shadow DRAM can be built on top of a CRC+RAID architecture and can function as a multi-stage, such as a two stage cache with a shadow DRAM. This can be implemented by using a shadow DRAM before write operations are performed in the main DRAM module which exhibits high bandwidth and low die/cost overheads.

In some embodiments, an add-in CXL memory module 352 can include a shadow DRAM 354 such that the data in a SRAM cache memory 350 of a memory controller 100 can be written to the shadow DRAM 354 before the data is stored in a DRAM memory device 360 to increase memory reliability. In various embodiments, the present disclosure includes CXL module implementations based on DRAM volatile memories. In some embodiments, the memory controller 100 can be configured as a CXL interface controller that enables communication with one or more CXL devices, such as CXL memory module 352, over a CXL communication path to which the CXL memory module 352 is connected. The CXL memory module 352 is capable of communication via a CXL protocol.

In some embodiments, the CXL memory module 352 can be a memory expansion card provided with a PCIe/CXL interface. This configuration has the ability to simply add or remove memory, like a storage device. A goal of the memory expansion card can be to improve or maximize memory capacity. In some embodiments, the memory expansion card can have on-die ECC circuitry to improve RAS. The ECC circuitry can provide error detection and/or correction with functionality such as CRC for added reliability. In at least one embodiment, the ECC circuitry can be managed by the controller of the memory expansion card. For example, a controller of a memory expansion card according to the present disclosure can be based on the PCIe5 physical layer. The controller interfaces can include one CXL (PCIe5) link with one transmission channel and one reception channel.

Referring back to FIG. 3A, the cache may be implemented as a two stage cache to improve bandwidth by eliminating write amplification. The two stage cache may include a SRAM cache memory 350 and a shadow DRAM 354 (see also FIG. 4). The SRAM cache memory 350 provided on a memory controller 100 can operate as the first stage cache. The shadow DRAM 354 provided on the CXL memory module 352 can operate as the second stage cache. The two stage cache provides a data pipeline for write operations. During a write operation, the shadow DRAM 354 can be used to store the data before write operations are performed in the main DRAM memory module 360.

The shadow DRAM 354 can be configured as having a single channel. Thus, the shadow DRAM 354 may be a single-channel shadow DRAM. The physical data transmission medium can be configured as a single channel to couple the SRAM cache memory 350 to the single port of the shadow DRAM 354. More than a single channel may exist between memory controller 100 and the CXL memory module 352. In a non-limiting example, the CXL memory module 352 may provide a 128 GB storage capacity. The exemplary CXL memory module 352 with a 128 GB storage capacity can have about 12 GB of space available for the data storage at the single channel of the shadow DRAM 354. The remaining 116 GB can be used for the data storage at the fifteen channels, CH1, CH2, ... CH15 of the main memory DRAM module 360.

During the write operation in this example, the SRAM cache memory 350 transfers a 64B user data 305 appended by 4B CRC parity data 310 to the single channel of the shadow DRAM 354, without simultaneously transferring the RAID parity data. The user data 305 can be written by adding a strong ECC to more reliably write the user data. A strong ECC and CRC parity data 310 can be applied to the block of user data 305 to correct errors within the block. The ECC and CRC parity data 310 can be used to enforce a strong ECC.

In some embodiments, the ECC circuit 116 may be configured as a strong ECC circuit to perform an error correction process on data stored in the shadow DRAM 354. In other words, the strong ECC circuit 116 generates an error correction code and provide write data with the error correction code in writing the user data 305 to the shadow DRAM 354. The strong ECC has an error correction capability that can correct two or more bit errors. Thus, the strong ECC may be able to correct most data errors caused by most types of defects.

The ECC circuit 116 of the central controller 110 can protect each user data 305 using a strong ECC, for example, Reed Solomon code. This memory protection scheme provides thorough and strong protection by combining ECC and CRC to strongly protect the data without extra storage and transfer overheads. Therefore, writing to the shadow DRAM 354 does not require overhead because the shadow DRAM 354 is used to store user data.

Instead of accessing multiple channels and performing multiple operations that include a RAID parity write during a write operation as performed in FIG. 2A, in this implementation of the shadow DRAM with CRC+RAID architecture 300 in FIG. 3A, the data is written from the SRAM cache memory 350 into the single channel of the shadow DRAM 354 without performing a RAID parity check or correction. In comparison, the two stage cache design accesses a single channel and performs 1.5 operations in FIG. 3A; whereas the traditional 15+1 design accesses two channels and performs six (6) operations during the write operation in FIG. 2A.

The calculation of the number of operations for the shadow DRAM 354 is based on the granularity scheme, described above. In this example, the memory system has a memory read/write granularity of 32B such that the minimum read/write operation that can be performed is based on a scale of 3B. Based on the scale factor, 64B equals one (1) read/write operation. Any read/write operation that is less than or equal to 32B is set equal to 32B, which on the scale factor is a 0.5 read/write operation. Therefore, in FIG. 3A, writing the 64B user data 305 represents 1 write operation and writing the 4B CRC parity data 310 represents a 0.5 write operation, which totals a 1.5 operation when writing into the shadow DRAM 354.

Figure 4:
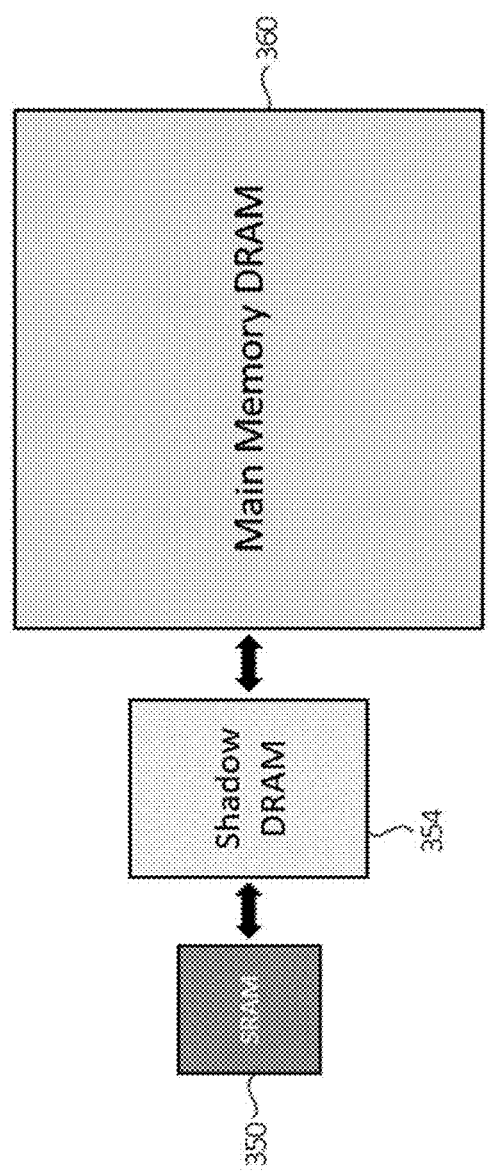
FIG. 4 is a block diagram of a two stage cache, according to an exemplary embodiment.

FIG. 4 illustrates a block diagram of the two stage cache described in FIG. 3A. The two stage cache may comprise a sequential storage scheme wherein the shadow DRAM 354 is positioned between the SRAM cache memory 350 and the main memory DRAM 360. The shadow DRAM 354 can be many times smaller than the main memory DRAM 360 it is shadowing and larger in size than the SRAM cache memory 350. The shadow DRAM 354 can be added to the data path to minimize the bandwidth impact, while not affecting the overall performance.

After the user data is written into the shadow DRAM 354, a subsequent request from the host for that particular data may be immediately accessed from the shadow DRAM 354 without accessing the main memory DRAM 360. Thus, requests for data in the shadow DRAM 354 can be processed faster than requests for data in the main memory DRAM 360 resulting in a faster transfer of data.

Due to the size limitation of the shadow DRAM 354, the shadow DRAM 354 does not permanently store the user data, but merely temporarily stores the data for such a time that the data can be saved to the main memory DRAM 360. During high traffic, in this example, the 64B user data 305 and the 4B CRC data 310 are written and temporarily stored in the shadow DRAM 354 by performing the 1.5 operation described above. During low traffic and when the capacity of the shadow DRAM 354 is full, the shadow DRAM 354 writes the 64B user data 305 and the 4B CRC data 310 to the main memory DRAM 360 by performing the six (6) operations.

Referring back to the example of FIG. 3A, to perform a write operation from the shadow DRAM 354 into the main memory DRAM 360, there are fourteen operating channels CH1, CH2, . . . CH14 that each store 64B user data 305 and 4B CRC data 310, and one channel, CH15, that stores 64B RAID parity data 315 and 4B CRC data 310. Thus, the main memory DRAM 360 can be a multi-channel memory device. In operation, the write operation writes the data through a plurality of channels to the multi-channel memory device. Two channels are desirably simultaneously accessed, and six (6) operations are performed. The six (6) operations include 3 logical page LP5 reads and 3 logical page LP5 writes.

In this example, the pair of channels, data channel CH1 and RAID parity channel CH15, are accessed simultaneously. The CH1 write operations (blocks 320A-325A and 345A) and the CH15 RAID parity write operations (blocks 320B-325B and 345B) are performed simultaneously, as shown in parallel in FIG. 3A. In block 320A, the 64B data is read out of the memory device, which represents one (1) read operation. Simultaneously in block 320B, the 64B RAID parity data is read out of the memory device, which represents another one (1) read operation. In block 325A, the 4B CRC data is read out of the memory device, which represents a half (0.5) read operation. Simultaneously in block 325B, the 4B CRC data is read out of the memory device, which represents another half (0.5) read operation.

In blocks 330A and 330B, the CRC check is performed. If the CRC is correct, the system prepares to write the new user data (in block 335A) and the new RAID parity data (in block 335B), to be stored in the memory device by performing a checksum calculation of the user data in comparison to the RAID parity data in block 340. Then, in block 345A, the new user data (1 write operations) and the new CRC parity data (0.5 write operations) are written to the memory device (the main memory DRAM 360). In block 345B, the new RAID parity data (1 write operations) and the new CRC parity data (0.5 write operations) are updated by being written to the memory device (the main memory DRAM 360).

For the two stage cache design, the total number of operations are 1.5+6 operations (indicated as reference 370) to write the data from the SRAM cache memory 350 through the shadow DRAM 354 to the main memory DRAM 360. The 1.5 operations are attributed to the inclusion of writing the data into the shadow DRAM 354. The six (6) operations are attributed to writing the data from the shadow DRAM 354 into the main memory DRAM 360. Therefore, the total number of operations are increased to 1.5+6 operations, in comparison to the traditional design of six (6) operations. However, at the time of writing the data to the shadow DRAM 354 of the memory module 352, the number of operations required is 1.5 operations which has a significant performance benefit on the bandwidth.

Figure 3B:
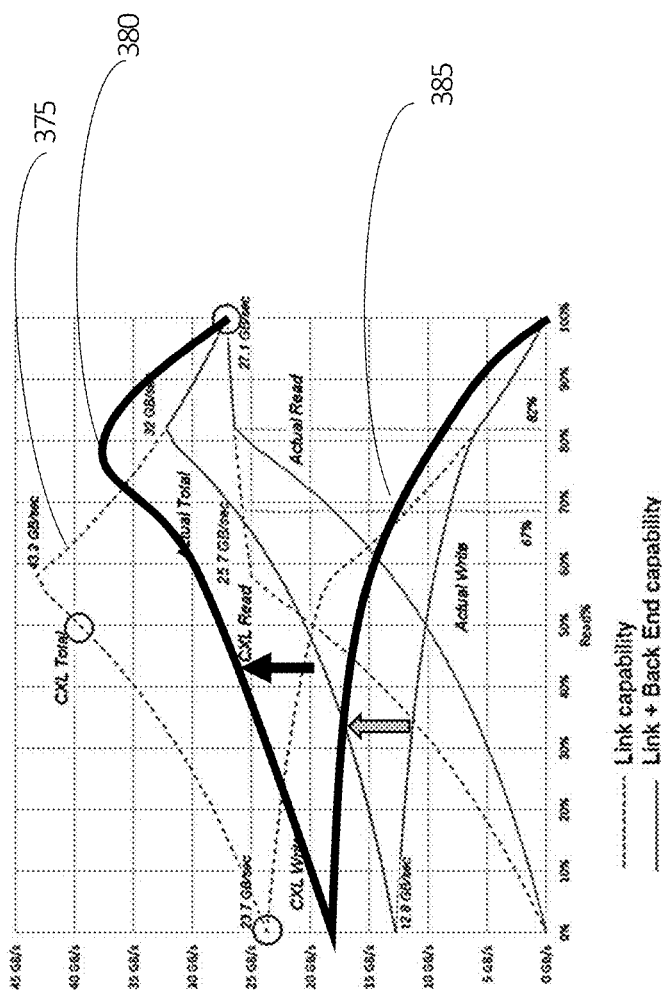
FIG. 3B is a graph of the improved bandwidth of the shadow DRAM with the CRC+RAID architecture of FIG. 3A.

FIG. 3B is a graph illustrating the improved CXL bandwidth in a 15+1 CRC+RAID+Shadow DRAM scheme. The 15+1 CRC+RAID+Shadow DRAM architecture increases the total CXL bandwidth, which is depicted by dotted line 375. For write operations, the increased CXL bandwidth is depicted by dotted line 380. For the read operations, the increased bandwidth is depicted by dotted line 385. This 15+1 CRC+RAID+Shadow DRAM architecture also reduces the overhead from 12.5% of the traditional design to 6.67%. In the 15+1 CRC+RAID+Shadow DRAM architecture, during a write operation, only one chip is accessed at a time. In contrast, a traditional chipkill designs require all chips to be accessed simultaneously to form a cache line. However, the RAID of the present disclosure involves the use of a single DRAM chip access to form the cache line.

Figure 5:
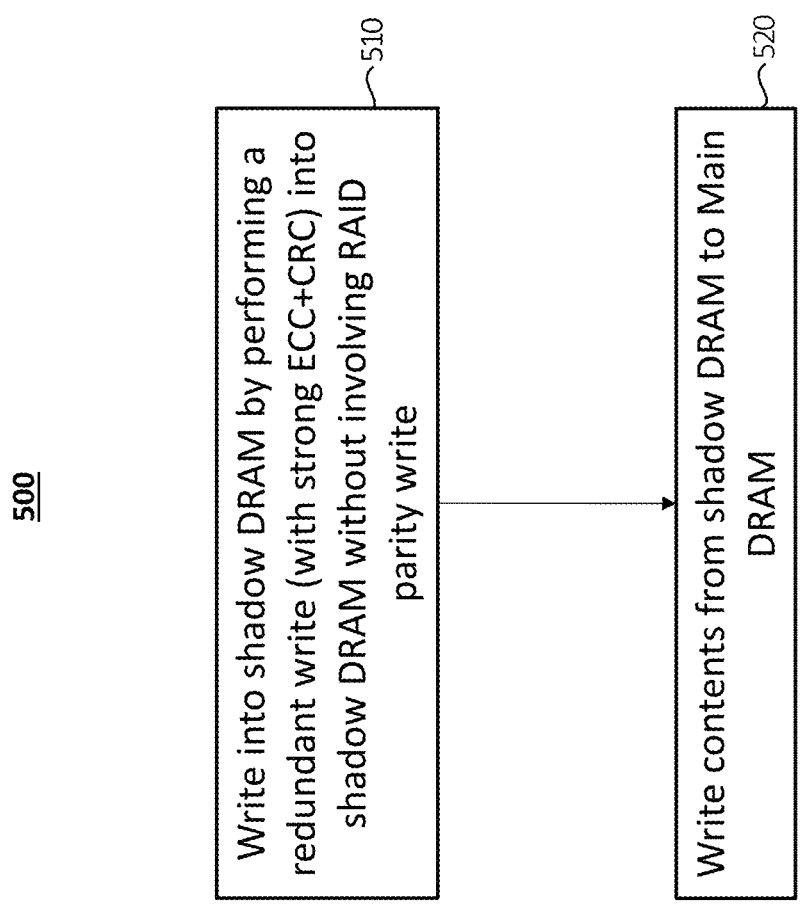
FIG. 5 illustrates a flow chart of an example method of operating a two stage cache to mitigate write amplification according to an embodiment.

FIG. 5 is a flow chart illustrating a method 500 of operation of the two stage cache of the 15+1 CRC+RAID+Shadow DRAM architecture. In block 510, during high traffic when there is high demand, the system writes into a shadow DRAM 354 before transferring the data to a main memory DRAM 360. The system performs redundant write operations with strong ECC and CRC into the shadow DRAM 354 without involving RAID parity writes. This leads to higher read and write bandwidth, which causes an increase in actual CXL bandwidth.

In block 520, during low traffic when the system is idle, the system writes the data from the shadow DRAM 354 to a main memory DRAM 360 after the data has been encoded with strong ECC and CRC. This enables the method 500 to harness the benefit of low power CRC+RAID as well as higher bandwidth.

FIG. 6 is a table comparing the metrics of the 15+1 CRC+RAID+Shadow DRAM architecture of the present disclosure to a standard 15+1 RAID and a standard 8+2 Chipkill. According to the present disclosure, a shadow DRAM can be built on top of a CRC+RAID architecture and can function as a two stage cache with a shadow DRAM. The present disclosure improves the write bandwidth of a CRC+RAID architecture without losing its advantage of power and OP.

All numerical values, for example, for the computing system, the DRAM and direct mapped cache configurations, and timing parameters, are exemplary and may be other numerical values, which are not limited by the examples provided in the present disclosure.

As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A system, comprising:
a volatile main memory module configured to store data;
a multi-stage cache memory comprising:
a shadow memory cache provided on the volatile main memory module; and
a memory controller cache coupled to the shadow memory cache;
a memory controller configured to:
receive data to be stored in the volatile main memory module;
store the data to the memory controller cache provided on the memory controller;
generate a strong error correcting code (ECC) corresponding to the data having a capability to correct two or more bit errors;
during a first write operation, write the data with the strong ECC from the memory controller cache to the shadow memory cache without writing a RAID (Redundant Arrays of Inexpensive Disks) parity data; and
during a second write operation, write the data with the strong ECC and write the RAID parity data from the shadow memory cache to a memory device provided on the volatile main memory module.

2. The system of claim 1, wherein the shadow memory cache is a shadow DRAM (Dynamic Random Access Memory).

3. The system of claim 2, wherein the memory controller is further configured to:
during the first write operation, write through a single channel the data with the strong ECC from the memory controller cache to the shadow DRAM without writing the RAID parity data; and
during the second write operation, write the data with the strong ECC and write the RAID parity data from the shadow memory DRAM simultaneously through respective channels to access a multi-channel memory device provided on the volatile main memory module.

4. The system of claim 1, wherein the shadow memory cache is a single-channel shadow DRAM.

5. The system of claim 1, wherein the shadow memory cache is a shadow DRAM built on top of a cyclic redundancy check (CRC)+Redundant Arrays of Inexpensive Disks (RAID) architecture.

6. The system of claim 5, wherein the CRC+RAID architecture includes a RAID component and an ECC component.

7. The system of claim 1, wherein the first write operation is a redundant write operation that includes writing the data with the strong ECC and a first CRC code; and
wherein the second write operation includes writing the data with the strong ECC and the first CRC code and the RAID parity data with a second CRC code.

8. The system of claim 7, wherein the strong ECC includes at least one of a chipkill code and a Reed Solomon code.

9. The system of claim 1, wherein the multi-stage cache memory is a two stage cache.

10. The system of claim 1, wherein the memory controller is further configured to:
perform the first write operation during high demand periods; and
perform the second write operation during low demand periods.

11. The system of claim 10, wherein the memory controller is further configured to perform the second write operation when the shadow memory cache is full of the data.

12. The system of claim 1, wherein the volatile main memory module is a Compute Express Link (CXL) memory module; and
the memory controller uses a PCIe/CXL (Peripheral Component Interconnect express/Compute Express Link) interface to communicate with the CXL memory module.

13. The system of claim 1, wherein the volatile main memory module is a memory expansion card.

14. The system of claim 1, wherein the volatile main memory module is an add-in CXL memory module.

15. The system of claim 1, wherein the memory controller is further configured to:
perform a fewer number of operations during the first write operation than the number of operations performed during the second write operation.

16. The system of claim 15, wherein the number of operations performed during the first write operation equals 1.5 operations based on a granularity of the system; and
wherein the number of operations performed during the second write operation equals 6 operations based on the granularity of the system.

17. The system of claim 1, wherein the memory controller cache is a SRAM (Static Random Access Memory).

18. The system of claim 1, wherein the memory controller comprises:
a front end portion comprising an interface to couple the memory controller to a host;
a central controller portion configured to cause performance of a memory operation and comprises the memory controller cache to store the data associated with the performance of the memory operation and the central controller portion comprising an ECC component configured to encrypt the data before storing the data in the volatile main memory module; and
a back end portion configured to couple the memory controller to the volatile main memory module via a single channel, which can be used to write the data to the volatile main memory module;
wherein the memory controller cache is a SRAM memory cache;
wherein the shadow memory cache is a single-channel shadow DRAM; and
wherein the volatile main memory module is an add-in CXL memory module.

19. The system of claim 18, wherein the memory controller performs the first write operation through the single-channel shadow DRAM before performing the second write operation through a plurality of channels to a multi-channel memory device in order to improve a write bandwidth and mitigate write amplification in CXL drives.

20. A method, comprising:
receiving at a memory controller data to be stored in an add-in CXL (Compute Express Link) volatile main memory module;
storing the data to a memory controller cache provided on the memory controller; generating a strong error correcting code (ECC) corresponding to the data having a capability to correct two or more bit errors;
providing a single-channel shadow DRAM (Dynamic Random Access Memory) on the add-in CXL volatile main memory module and assigning the single-channel shadow DRAM to a portion of a storage capacity of the add-in CXL volatile main memory module;
providing a multi-channel memory device on the add-in CXL volatile main memory module and assigning the multi-channel memory device to a remaining portion of the storage capacity of the add-in CXL volatile main memory module; and
writing the data with the strong ECC from the memory controller cache to the single-channel shadow DRAM without writing a RAID (Redundant Arrays of Inexpensive Disks) parity data before writing the data with the strong ECC and the RAID parity data from the single-channel shadow DRAM to the multi-channel memory device.

* * * * *